United States Patent [19]

Jenkins

[11] Patent Number: 4,917,841
[45] Date of Patent: Apr. 17, 1990

[54] METHOD OF MAKING A REFRIGERATOR CABINET LINER HAVING NON-CRINKLED CORNERS

[75] Inventor: Thomas E. Jenkins, Louisville, Ky.

[73] Assignee: General Electric Company, Louisville, Ky.

[21] Appl. No.: 254,732

[22] Filed: Oct. 7, 1988

[51] Int. Cl.$^4$ ............................................. B29C 67/22
[52] U.S. Cl. .................................. 264/46.5; 264/46.6; 264/46.8
[58] Field of Search .................... 264/46.4, 46.5, 46.8, 264/46.6

[56] References Cited

U.S. PATENT DOCUMENTS

| | | | |
|---|---|---|---|
| 3,122,598 | 2/1964 | Berger | 264/247 |
| 3,440,308 | 4/1969 | Carbary et al. | 264/46.5 |
| 3,911,190 | 10/1975 | Myers et al. | 264/46.5 |
| 3,944,111 | 3/1976 | Nonomaque et al. | 264/46.5 |
| 4,535,574 | 8/1985 | Dettelbach et al. | 264/46.8 |
| 4,676,938 | 6/1987 | Karklin et al. | 264/46.5 |
| 4,771,532 | 9/1988 | Taylor, Jr. et al. | 264/46.5 |

Primary Examiner—Jan H. Silbaugh
Assistant Examiner—Allan R. Kuhns
Attorney, Agent, or Firm—Frederick P. Weidner; Radford M. Reams

[57] ABSTRACT

A refrigerator liner of a vacuum formed plastic with a thickness of about 0.007" to 0.050" has each corner formed without crinkling when thermal insulation material is foamed against the outer surface of the liner. The non-crinkling of each corner of the refrigerator liner is accomplished through forming each of the corners with a flat surface having its periphery as a circle during vacuum forming of the refrigerator liner rather than with a spherical radius. This enables the flat surface to be placed in tension when moved against a corresponding flat surface of a foam plug by the pressure produced during foaming of the foamed thermal insulation material. This results in each corner having a central portion with a convex cross section and an outer portion surrounding the central portion and concave in cross section whereby it does not appear to be crinkled.

12 Claims, 3 Drawing Sheets

METHOD OF MAKING A REFRIGERATOR CABINET LINER HAVING NON-CRINKLED CORNERS

FIELD OF THE INVENTION

This invention relates to a very thin vacuum formed structure of plastic having non-crinkled corners and a method of making.

BACKGROUND OF THE INVENTION

When forming a refrigerator cabinet with a foamed thermal insulation material such as urethane between the inner liner and the outer casing, the foam is introduced as a liquid into the space between the liner and the casing and foams into place by adhering to both the outer surface of the liner and the inner surface of the casing. During this formation of the refrigerator cabinet, a foam plug is disposed within the liner in spaced relation thereto to have a predetermined clearance therebetween. This predetermined clearance is necessary because of tolerance variations of the vacuum formed inner liner.

During foaming of urethane, a pressure of about 3-5 p.s.i. is exerted against the outer surface of the liner. As the thickness of the liner decreases, the pressure exerted during foaming causes movement of the inner surface of the liner against the foam plug. Since the liner is vacuum formed, its corners previously have been produced on a spherical radius. As the thickness of the liner decreases, the slight pressure created by foaming of the thermal insulation material can cause deformation of the liner so that it is pushed against the foam plug. As the pressure increases, increased thicknesses of the liner can be pushed against the foam plug.

When the liner has its inner surface pushed by the foaming pressure against the foam plug, there will be buckling of each corner of the inner liner having a spherical radius. This occurs because a portion of the liner at each corner with the spherical radius is placed in compression when moved against a corresponding surface of the foam plug. This compression of each corner of the liner seeks to increase the total distance of the corner, and this is not possible so that the corner buckles. This produces a crinkling effect, which is aesthetically undesirable.

SUMMARY OF THE INVENTION

The present invention avoids crinkling of each corner of the liner of a refrigerator cabinet by forming each corner of the liner flat, rather than on a spherical radius, during vacuum formation of the liner. When the pressure created by foaming of the thermal insulation material acts against the outer surface of the liner, the flat surface of each corner of the liner abuts a corresponding flat surface on the foam plug. This places the flat surface in tension to shorten it. As a result, each corner of the liner has a central circular portion of convex shape in cross section and an outer surrounding portion of concave shape in cross section. When viewed from the interior of the liner as a user would do, the corners do not have a crinkled appearance but appear straight or flat.

An object of this invention is to form a very thin liner of a refrigerator cabinet with non-crinkled corners.

Another object of this invention is to form each corner of a vacuum formed structure that is very thin without crinkles.

Other objects of this invention will be perceived from the following description, claims, and drawings.

BRIEF DESCRIPTION OF THE DRAWINGS

The attached drawings illustrate a preferred embodiment of the invention, in which.

DESCRIPTION OF THE PREFERRED EMBODIMENT

Figure 1:
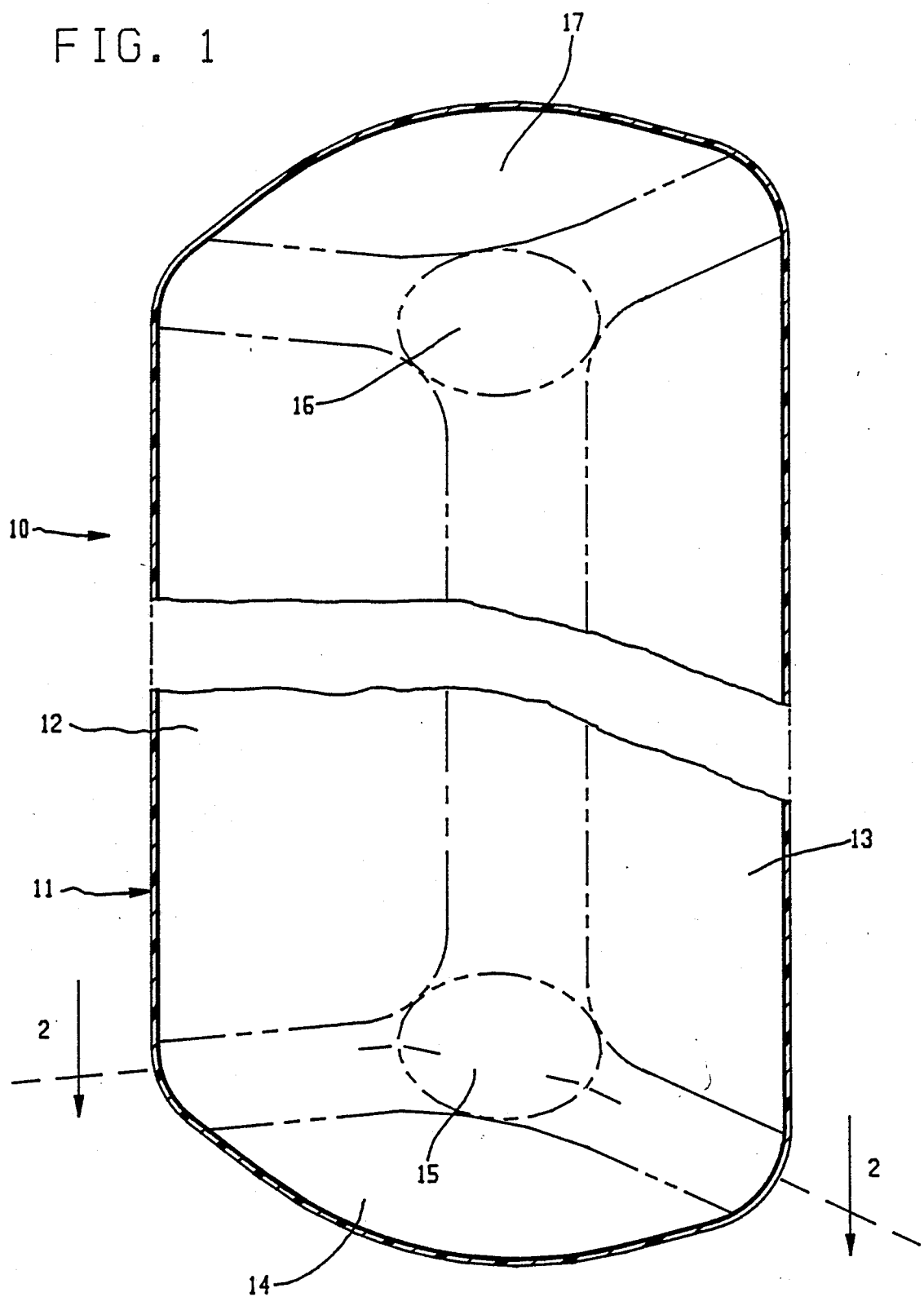
FIG. 1 is a fragmentary perspective view of a portion of an upper corner and a lower corner of a refrigerator cabinet liner having each corner formed in accordance with the present invention.
Figure 2:
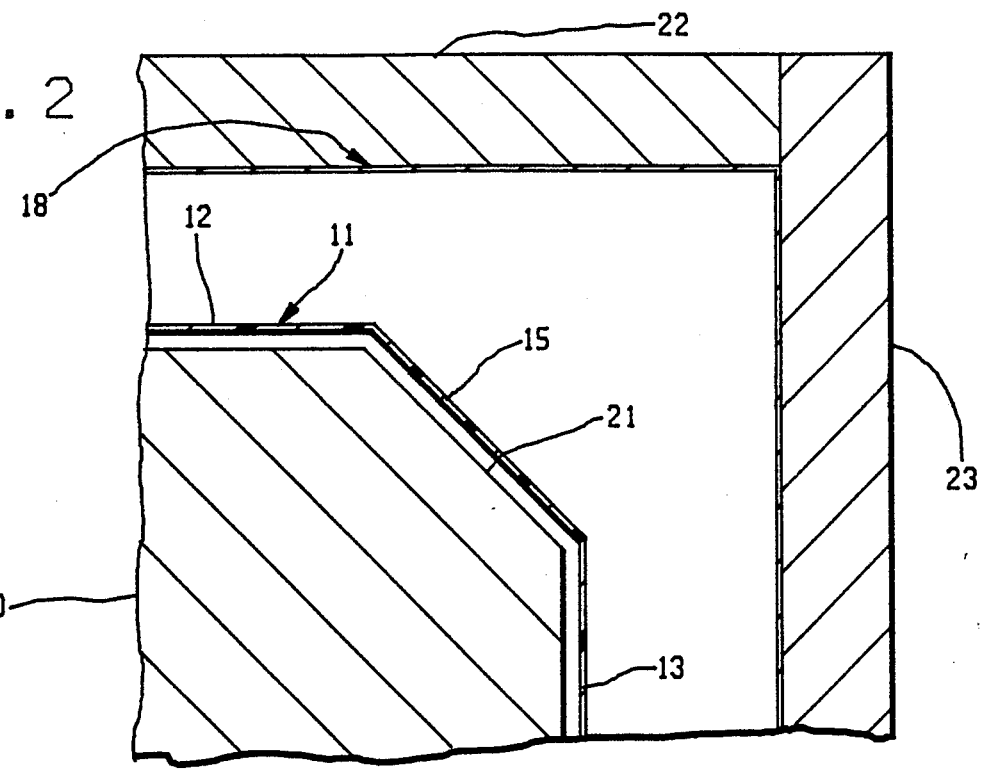
FIG. 2 is a fragmentary sectional view of a portion of the liner of FIG. 1 taken along line 2—2 of FIG. 1 and an outer casing and showing the liner disposed in spaced relation to a foam plug and the outer casing prior to foaming of the foamed thermal insulation material.

Referring to the drawings and particularly FIG. 1, there is shown a refrigerator cabinet 10 including a liner 11 of a vacuum formed plastic. The liner 11 includes a rear wall 12, a side wall 13, and a bottom wall 14. The walls 12, 13, and 14 intersect to form a bottom corner 15 having a flat surface, as shown in FIG. 2, with the flat surface being formed with its periphery as a circle during vacuum forming of the liner 11.

The liner 11 (see FIG. 1) also has a top corner 16 formed at the intersection of the rear wall 12 and the side wall 13 with a top wall 17. The liner 11 also has a bottom corner (not shown) formed by the other side wall (not shown), the rear wall 12, and the bottom wall 14 and a top corner (not shown) formed by the other side wall, the rear wall 12, and the top wall 17.

Figure 3:
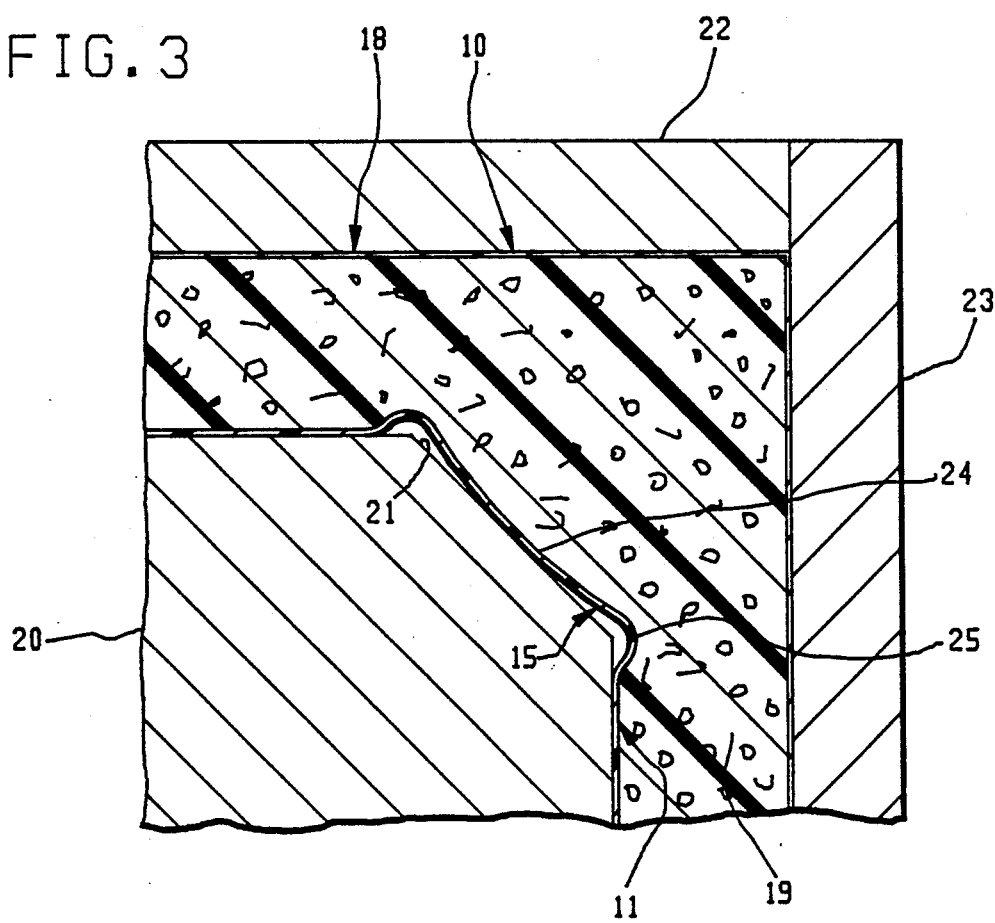
FIG. 3 is a fragmentary sectional view showing the formation of the corner of the liner of FIG. 2 after foaming of the foamed thermal insulation material is completed.

As shown in FIG. 3, the refrigerator cabinet 10 includes an outer casing 18 and foamed thermal insulation material 19 between the outer casing 18 and the liner 11. When the foamed thermal insulation material 19 is to be foamed in place between the liner 11 and the outer casing 18, a foam plug 20 (see FIG. 2) of metal is positioned within the inner liner 11, which is open at the front.

The foam plug 20 has a flat surface 21, which has its periphery as a circle, formed on the same angle as the angle of the bottom corner 15. Thus, the flat surface 21 of the foam plug 20 is substantially parallel to the flat surface of the bottom corner 15 prior to the thermal insulation material 19 (see FIG. 3) being foamed in place.

When the foamed thermal insulation material 19 is to be foamed in place and adhered to both the outer surface of the liner 11 and the inner surface of the outer casing 18, the outer casing 18 (see FIG. 2) is positioned at a desired spacing from the liner 11 and retained in position by plates 22 and 23. With the plates 22 and 23 so positioned, a liquid foam material such as urethane, for example, is introduced into the space between the outer surface of the liner 11 and the inner surface of the outer casing 18.

As foaming occurs to convert the liquid foam material into the foamed thermal insulation material 19 (see FIG. 3), a pressure of 3-5 p.s.i. is created on the outer surface of the liner 11. This causes all of the surfaces of the liner 11 to move towards the corresponding surfaces of the foam plug 20. As a result, the bottom corner 15 is placed in tension so that a central circular portion 24 of the bottom corner 15 is moved against the flat surface 21 of the foam plug 20 to form the central portion 24 of the corner 15 with a slight convex shape in cross section as viewed in FIG. 3. This also produces an outer portion 25 of the bottom corner 15 surrounding the central portion 24 with the outer portion 25 having a concave shape in cross section as shown in FIG. 3. The outer portion 25 has its periphery formed as a circle.

This resulting shape of the bottom corner 15 does not produce any crinkling of the bottom corner 15. Thus, an aesthetic appearance of the bottom corner 15 is produced. Likewise, the top corner 16 (see FIG. 1) of the liner 11 and the other two corners (not shown) of the liner 11 are similarly formed.

Figure 4:
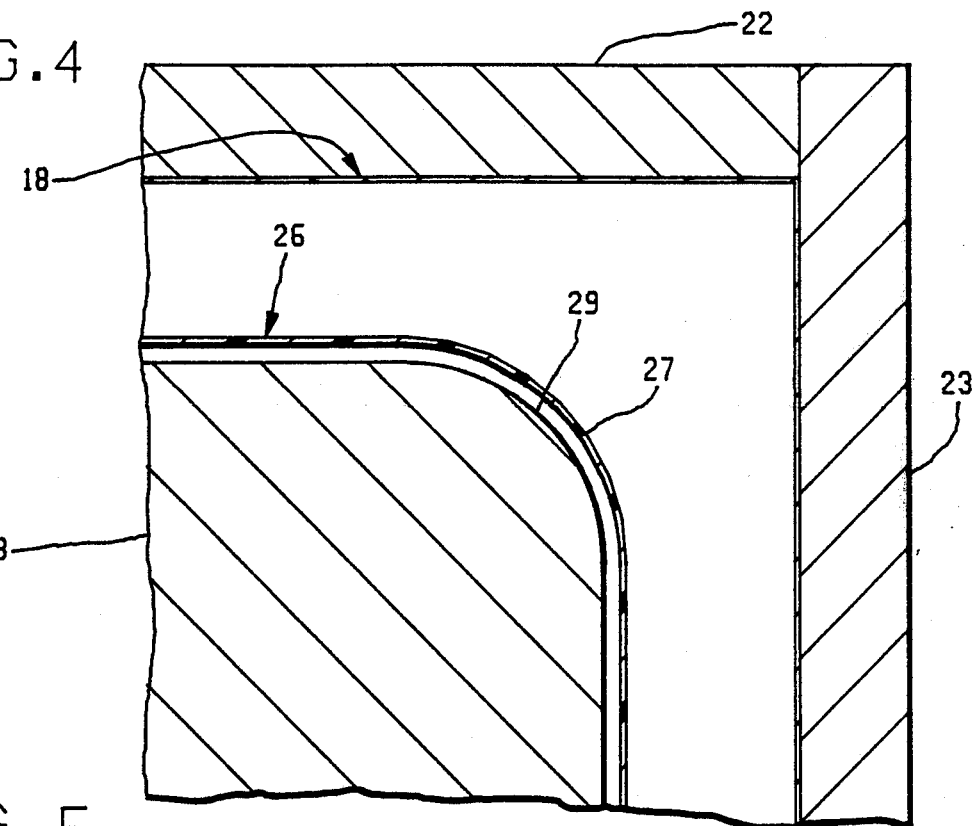
FIG. 4 is a fragmentary sectional view of a corner of a refrigerator cabinet liner having a spherical radius and an outer casing and showing the liner disposed in spaced relation to a foam plug and the outer casing prior to foaming of the foamed thermal insulation material.

Referring to FIG. 4, there is shown a refrigerator cabinet liner 26, which is vacuum formed, with a bottom corner 27 having a spherical radius. A foam plug 28 has a similar spherical surface 29 for cooperating with the spherical radius of the bottom corner 27 when the foamed thermal insulation material 19 (see FIG. 5) is foamed in place between the liner 26 and the outer casing 18. The outer casing 18 has the plates 22 and 23 cooperating therewith in the same manner as discussed with respect to FIGS. 2 and 3.

Figure 5:
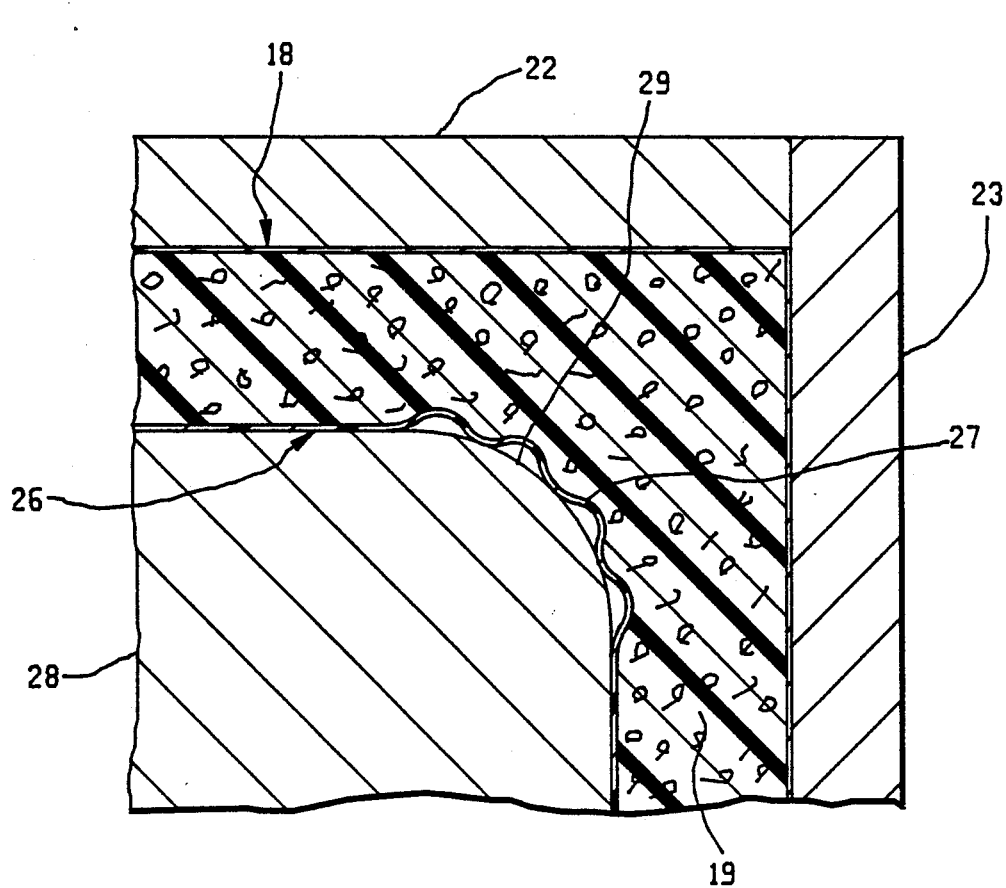
FIG. 5 is a fragmentary sectional view showing formation of the corner of the liner of FIG. 4 after foaming of the foamed thermal insulation material is completed with the corner being crinkled.

With the foam plug 28 (see FIG. 4) having the spherical surface 29 and the bottom corner 27 having a spherical radius, the introduction of the liquid foam material into the space between the liner 26 and the outer casing 18 so that foaming occurs with a pressure of 3-5 p.s.i. results in the bottom corner 27 of the liner 26 buckling as shown in FIG. 5. This creates the undesirable crinkles. This buckling of the bottom corner 27 of the liner 26 is created by compression of the bottom corner 27 as the foaming pressure of the formed thermal insulation material 19 causes movement of the liner 26 against the foam plug 28.

With the foaming pressure of the urethane being about 3-5 p.s.i., the refrigerator cabinet liner 26 or other structure having corners formed with a spherical radius will be crinkled at each corner when the range of the thickness of the liner varies from about 0.007" to 0.050". The maximum thickness of the liner 11 (see FIG. 1) at which this invention is used is that at which the liner 11 will not crinkle. Thus, if the foaming pressure increases beyond 3-5 p.s.i., then a greater thickness of the liner 11 than 0.050" would require this invention to avoid a crinkled corner.

An advantage of this invention is that it prevents crinkling at each corner of a vacuum formed structure such as a refrigerator cabinet liner, for example, of a relatively thin material. Another advantage of this invention is that it enables a relatively thin liner of a refrigerator cabinet to have an aesthetic appearance at each corner.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

I claim:

1. A method of forming each corner of intersecting walls of a very thin structure of a vacuum formed plastic to avoid crinkling of each corner because of movement of the structure due to its thinness when pressure is applied to the outer structure of the structure during foaming of a liquid foam including:
   forming each corner of the intersecting walls of the structure with a flat surface during vacuum forming of the structure;
   disposing the vacuum formed structure with its inner structure in spaced relation to a foam plug having a flat surface at each corner corresponding to the flat surface at each corner of the vacuum formed structure so as to have a predetermined clearance therebetween;
   disposing the vacuum formed structure with its outer surface in spaced relation to a casing to form a space therebetween;
   and supplying a liquid foam into the space between the vacuum formed structure and the casing so that the liquid foam converts into plastic foam during foaming to adhere the plastic foam to the outer surface of the vacuum formed structure and the inner surface of the casing with the foaming pressure on the outer surface of the vacuum formed structure causing movement of the inner surface of the vacuum formed structure against the foam plug including the flat surface of each corner of the vacuum formed structure engaging the corresponding flat surface of the foam plug so that the flat surface of each corner of the vacuum formed structure is placed in tension to avoid crinkling of each corner of the vacuum formed structure.

2. The method according to claim 1 in which the maximum thickness of the structure is that at which the structure moves in response to the foaming pressure so that the flat surface at each corner of the structure engages the corresponding flat surface at each corner of the foam plug.

3. The method according to claim 2 including forming the periphery of the flat surface of each corner of the structure as a circle.

4. The method according to claim 1 in which the thickness of the vacuum formed plastic of the structure is in the range of about 0.007" to 0.050".

5. The method according to claim 4 including forming the periphery of the flat surface of each corner of the structure as a circle.

6. The method according to claim 1 including forming the periphery of the flat surface of each corner of the structure as a circle.

7. A method of forming each corner of intersecting walls of a very thin liner of a refrigerator cabinet of a vacuum formed plastic to avoid crinkling of each corner because of movement of the liner due to its thinness when pressure is applied to the outer surface of the liner during foaming of a liquid foam to form a foamed thermal insulation material including:

forming each corner of the intersecting walls of the liner with a flat surface during vacuum forming of the liner;

disposing the vacuum formed liner with its inner surface in spaced relation to a foam plug having a flat surface at each corner corresponding to the flat surface of each corner of the vacuum formed liner so as to have a predetermined clearance therebetween;

disposing the vacuum formed liner with its outer surface in spaced relation to a casing to form a space therebetween;

and supplying a liquid foam into the space between the vacuum formed liner and the casing so that the liquid foam converts into a foamed thermal insulation material during foaming to adhere the foamed thermal insulation material to the outer surface of the vacuum formed liner and the inner surface of the casing with the foaming pressure on the outer surface of the vacuum formed liner causing movement of the inner surface of the vacuum formed liner against the foam plug including the flat surface of each corner of the vacuum formed liner engaging the corresponding flat surface of the foam plug so that the flat surface of each corner of the vacuum formed liner is placed in tension to avoid crinkling of each corner of the vacuum formed liner.

8. The method according to claim 7 in which the maximum thickness of the liner is that at which the liner moves in response to the foaming pressure so that the flat surface at each corner of the liner engages the corresponding flat surface at each corner of the foam plug.

9. The method according to claim 8 including forming the periphery of the flat surface of each corner of the liner as a circle.

10. The method according to claim 7 in which the thickness of the vacuum formed plastic of the liner is in the range of about 0.007" to 0.050".

11. The method according to claim 10 including forming the periphery of the flat surface of each corner of the liner as a circle.

12. The method according to claim 7 including forming the periphery of the flat surface of each corner of the liner as a circle.

* * * * *

UNITED STATES PATENT AND TRADEMARK OFFICE
CERTIFICATE OF CORRECTION

PATENT NO. : 4,917,841
DATED : April 17, 1990
INVENTOR(S) : Thomas E. Jenkins

It is certified that error appears in the above-identified patent and that said Letters Patent is hereby corrected as shown below:

Column 4, line 13, "outer structure" should read --outer surface--.

Column 4, line 19, "structure" should read --surface--.

Signed and Sealed this

Seventeenth Day of September, 1991

Attest:

HARRY F. MANBECK, JR.

*Attesting Officer*   *Commissioner of Patents and Trademarks*